United States Patent Office 3,143,123
Patented Aug. 4, 1964

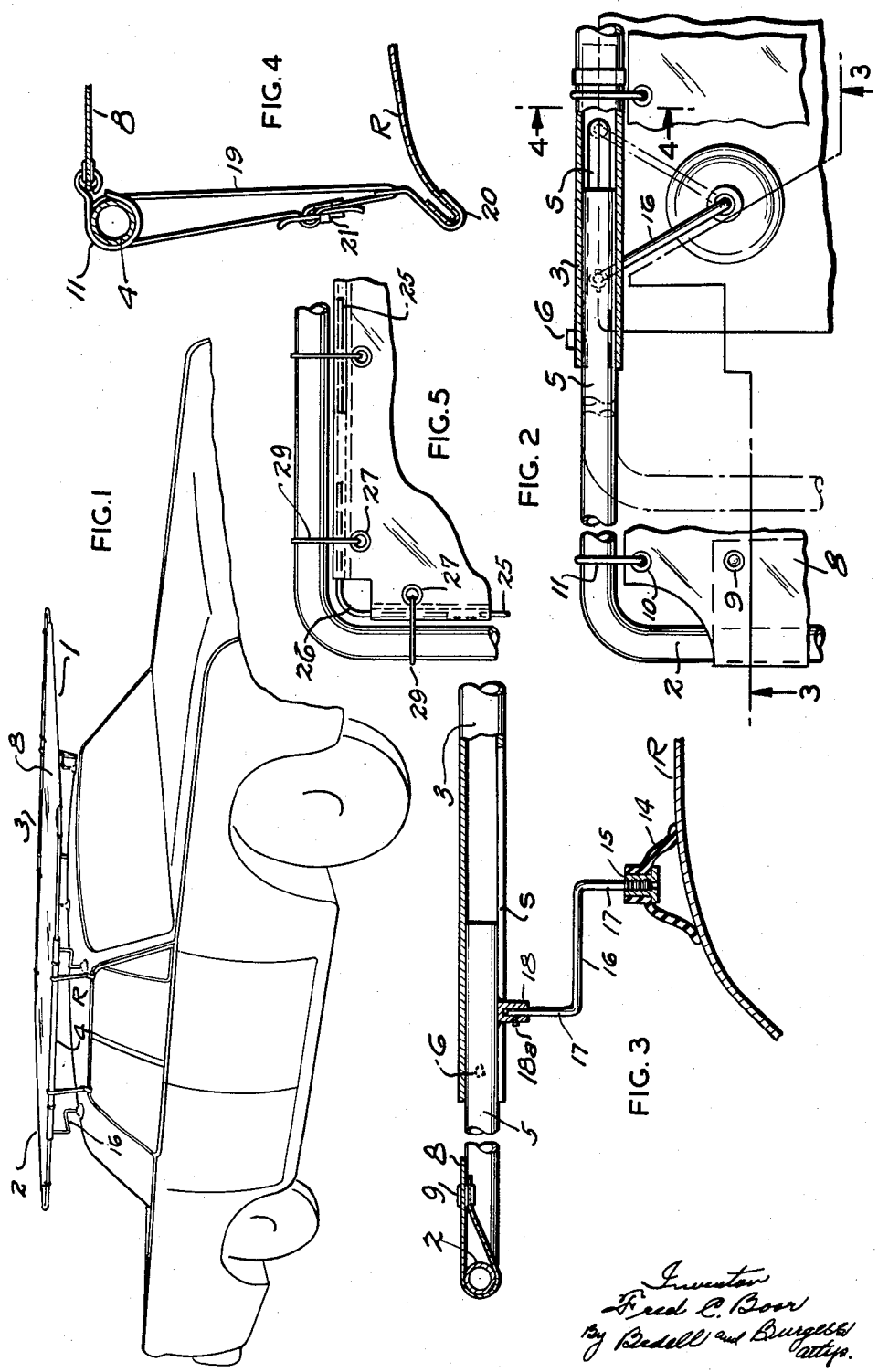

3,143,123
SUN PROTECTOR FOR VEHICLES
Fred C. Boor, 4976 Fyler Ave., St. Louis 39, Mo.
Filed Sept. 5, 1961, Ser. No. 135,924
1 Claim. (Cl. 135—5)

The invention relates to a sun protector for vehicles and particularly for the roof of an automobile, truck, boat, or other vehicle which is likely to be heated uncomfortably, particularly when left standing in the sunshine for an extended period.

The main object of the invention is to prevent the sun's rays striking the roof directly and to facilitate the circulation of air between the roof and the sun protector spaced above the roof. Also it is desired to facilitate ready application and removal of the protector to and from the roof of the vehicle and to readily adjust the sun protector horizontally relative to the vehicle roof.

In the accompanying drawings illustrating the invention:

FIG. 1 is a perspective view of an automobile with a sun protector applied to the roof.

FIG. 2 is a detailed top view of one corner of the sun protector and the adjacent portion of the roof.

FIGS. 3 and 4 are detailed vertical sections on lines 3—3 and 4—4 respectively of FIG. 2.

FIG. 5 is a detailed view similar to FIG. 2 but shows a modified structure.

The protector comprises essentially a rectangular frame formed of tubular metal and preferably of two end sections 1, 2, each having a U-shaped contour, and two straight side rails 3, 4. The legs 5 of the end sections are telescopingly received within side rails 3, 4 whereby the length of the frame may be adjusted. One or more set screws 6 will hold the assembled parts in selected position. A canvas sheet 8 extends from end to end and from side to side of the frame. FIG. 2 shows one end of the sheet folded over end rail 2 and secured by a clamp fastener 9. The figure shows one side of the sheet provided with grommets 10 from which wire hooks 11 extend outwardly and around the adjacent frame elements 3, 5.

The frame and canvas sheet is mounted on the car roof R by supports each embodying an inverted rubber cup-like foot 14 fitted with a metal bushing 15 into which is threaded the lower end of a Z-shaped support rod having a horizontal web 16 and upright arms 17 extending upwardly and downwardly from opposite ends thereof. The upper end of the support rod is rotatably received in a bushing 18 welded to a frame leg 5. A set screw 18a is tightened to hold the rod and bushing 18 in adjusting position. The lower end portions of side rails 3, 4 are slotted at S to accommodate the passage of bushing 18.

Preferably hold-down straps 19 will be provided with hooks 20 at their lower ends and each strap will be passed around the tubular frame and through a buckle 21. These straps will serve to tighten the supports and prevent the sway of the supports on the roof.

In FIG. 5 the construction of the frame and its mounting upon the vehicle roof will be as shown in FIGURES 1–4 but the attachment of the canvas to the frame will include sections of stiff wire sewed into pockets or seams in the canvas. Several straight wire sections 25 will be enclosed in each side and end of the canvas and an L-shaped section 26 with a rounded angle will be provided at each corner of the canvas. Grommets 27 through the canvas adjacent the wires will receive hooks 29 passing around the tubular frame in a manner similar to hooks 11.

The sun protector is shown with its end portions projecting forwardly and rearwardly beyond the ends of the vehicle roof but the protector will be of substantially the same width as the roof, and centered transversely thereof. However, the Z-shaped supports provide for shifting the protector forwardly and rearwardly and even laterally if so desired. Also they help to readily maintain the canvas tight. The device is easily applied to and removed from the roof whenever desired.

The details of the structure are illustrative and may be varied without departing from the spirit of the invention and the exclusive use of such modifications as come within the scope of the claim is contemplated.

What is claimed is:

A sun protector for a vehicle roof, comprising a rigid rectangular frame with sides formed of elongated substantially straight tubes having longitudinally disposed slots, each end of the frame being of U-shape with a cross bar and with parallel legs substantially normal thereto and telescopingly received in said tubes to vary the length of the frame, a flexible fabric sheet stretched over said frame and secured at its margins to said frame, supports for said frame and sheet positioned at the corners of said frame and each comprising an upstanding bushing fixed to one of said legs and being slidable in one of said slots, an elongated horizontal arm with one end pivotally secured to said bushing and provided at its other end with a depending element for pivotally mounting the support on a vehicle roof, said arms and depending elements being movably mounted about their pivots to the frame to accommodate shifting of said frame and fabric sheet as a unit over a vehicle roof in which the protector is applied and means to secure said legs at selected positions in said tubes.

References Cited in the file of this patent

UNITED STATES PATENTS

| 406,100 | Jones | July 2, 1889 |
| 988,923 | Bauerfeind | Apr. 4, 1911 |
| 1,988,380 | Goldberg | Jan. 15, 1935 |
| 2,231,293 | Norman | Feb. 11, 1941 |
| 2,496,085 | Engelheart | Jan. 31, 1950 |
| 2,948,288 | Nelson | Aug. 9, 1960 |

FOREIGN PATENTS

| 798,110 | France | Mar. 2, 1936 |